Feb. 12, 1935.  A. J. MEYER  1,990,558
ENGINE
Filed July 11, 1931   2 Sheets-Sheet 2

INVENTOR.
Andre J. Meyer
BY
ATTORNEY.

Patented Feb. 12, 1935

1,990,558

UNITED STATES PATENT OFFICE 1,990,558

ENGINE

Andre J. Meyer, Detroit, Mich., assignor to Continental Motors Corporation, Detroit, Mich., a corporation of Virginia Application July 11, 1931, Serial No. 550,064

32 Claims. (Cl. 123—81)

This invention relates to internal combustion engines and refers more particularly to the sleeve valve types of engines as distinguished from poppet valve engines. More specifically my invention provides improved methods and constructions relating to the Burt-McCollum type of single sleeve valve engine in which the sleeve is given a combined axial reciprocation and oscillation in accomplishing the porting and other cycles of the engine performance, but I desire it understood that my improvements are for the most part equally adaptable to other types of engines than the single sleeve type as will be more apparent from my disclosure.

Heretofore considerable difficulty has been experienced in fitting the sleeve valve or valves to the parts associated therewith, usually within the cylinder, to maintain a gas seal sufficient to permit relatively high explosion pressures without attendant friction losses. In other words, when the sleeve is fitted relatively tight or close (such as .0015 inch clearance from the cylinder for example) to maintain the desired seal for the development of high pressures and to prevent excessive oil pumping and carbonizing in the combustion chamber, then under such conditions the resulting friction due to the tight fit over the sleeve length increases the friction loss in the engine often to the point where it negatives the advantages derived from the tight fit. On the other hand when the sleeve is fitted relatively loosely (such as .004 clearance with the cylinder for example) the power developed by the engine increases owing to the reduced friction loss but such increase is offset by gas loss during explosion and by the attendant disadvantages of oil pumping past the sleeve with carbonization in the combustion chamber.

In reference to the single sleeve engine of the aforesaid combined movement type I have discovered that the sleeve tends to bear against the cylinder principally in the vicinity of the cylinder ports (where such zone is subjected to the peak explosion pressures) and near the bottom of the cylinder. The sleeve with customary valving for the engine described is ordinarily oscillating at the top of its stroke during the peak pressure development and such pressure tends to expand the sleeve at the cylinder port zone, the sleeve bearing principally at such times at said zone and at a second zone adjacent the bottom of the cylinder, this being emphasized with a wobble type drive such as illustrated herein.

It is an object of my invention to provide improved methods and constructions for the sleeves and cylinders whereby I am enabled to retain the tight gas seal at the cylinder ports with attendant increased engine power and without carbonization in the combustion chamber and at the same time to minimize the friction losses so as to actually realize the aforesaid advantages in the net performance of the engine. I accomplish this specifically by providing a clearance between the sleeve and cylinder at the zone of sleeve exposure to peak pressures whereby friction losses at this pont are minimized, the sleeve being provided with spaced bands of a diameter sufficient to tightly engage the cylinder, whereby the sleeve friction is localized to provide relatively high pressure intensity thereby reducing the coefficient of friction and the total friction loss. At the same time the sleeve is given a clearance with the cylinder at the zone of maximum gas pressure whereby usual friction losses experienced by sleeve expansion under such pressure is eliminated.

As a still further improvement in the art referred to I provide novel improvements for maintaining a highly efficient gas seal for the sleeve by distorting the sleeve to form outwardly extending portions at the ports whereby such portions exert yielding pressure against the cylinder to seal the sleeve.

Further objects and advantages of my invention will be apparent as this specification progresses, reference being made to the accompanying drawings in which Fig. 1 is a sectional elevation view of a typical engine cylinder for a representative sleeve valve engine showing my invention incorporated therewith.

Fig. 1ª is a detail enlarged view illustrating a modified form of sleeve construction.

Figures 1, 1A:
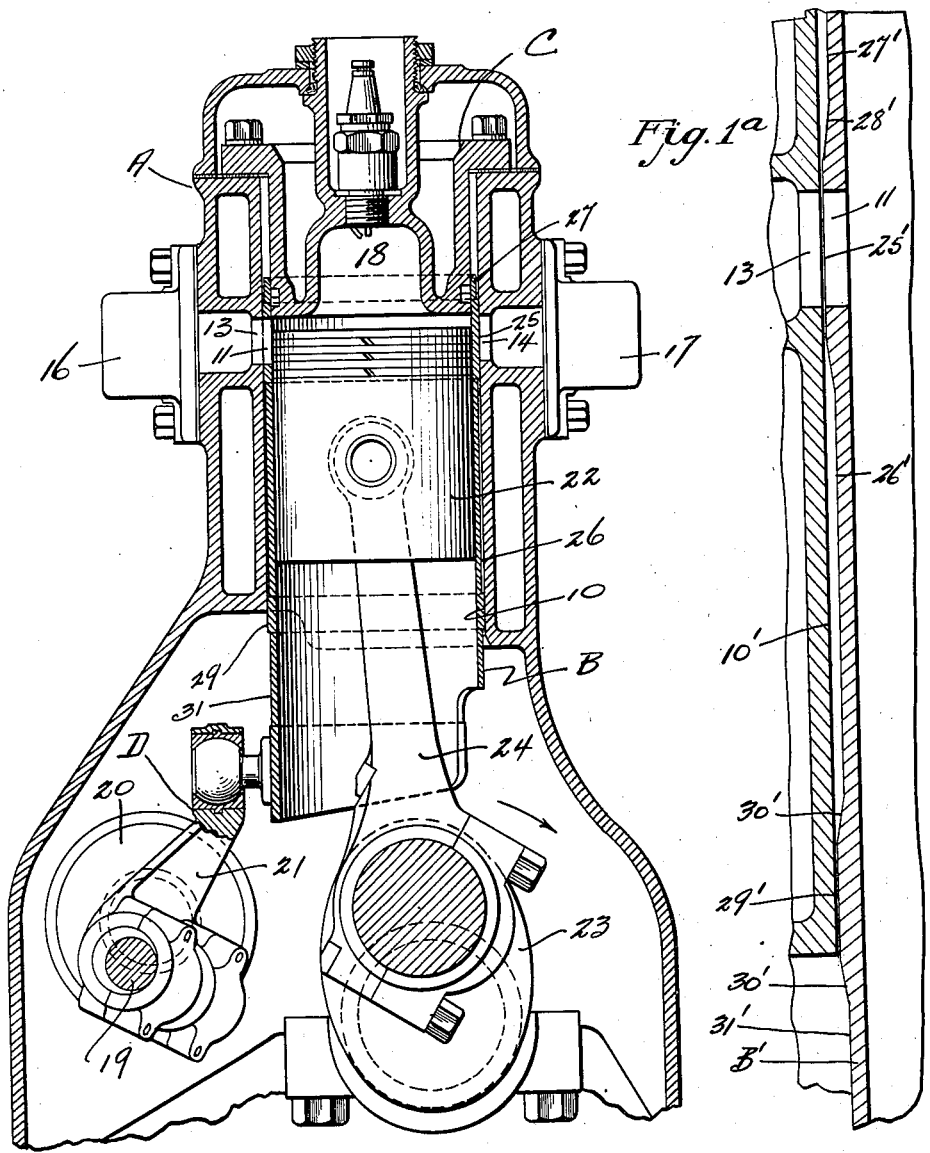

In the drawings reference character A represents an engine and for purposes of illustration this engine is shown as the Burt-McCollum type as aforesaid, the sleeve valve B moving in cylinder 10 to cause intake ports 11 and exhaust ports 12 thereof to perform the usual valving functions with cylinder intake and exhaust ports 13 and 14 respectively, the port 15 (see Fig. 4) being larger than the other ports to form the usual double purpose port. Intake and exhaust manifolds 16, 17 respectively communicate with the cylinder ports 13, 14. The cylinder is closed by the usual cylinder head assembly C of the reentrant type providing the combustion chamber 18. The sleeve is moved by a suitable driving mechanism D illustrated as a wobble crank 19 carried by the valve shaft 20 driven at half engine crankshaft speed for the usual four stroke cycle, the wobble crank 19 being connected to the sleeve by the sleeve link 21. Within the sleeve B is located the usual piston 22 operating crankshaft 23 by the connecting rod 24.

Figures 2, 3, 4:
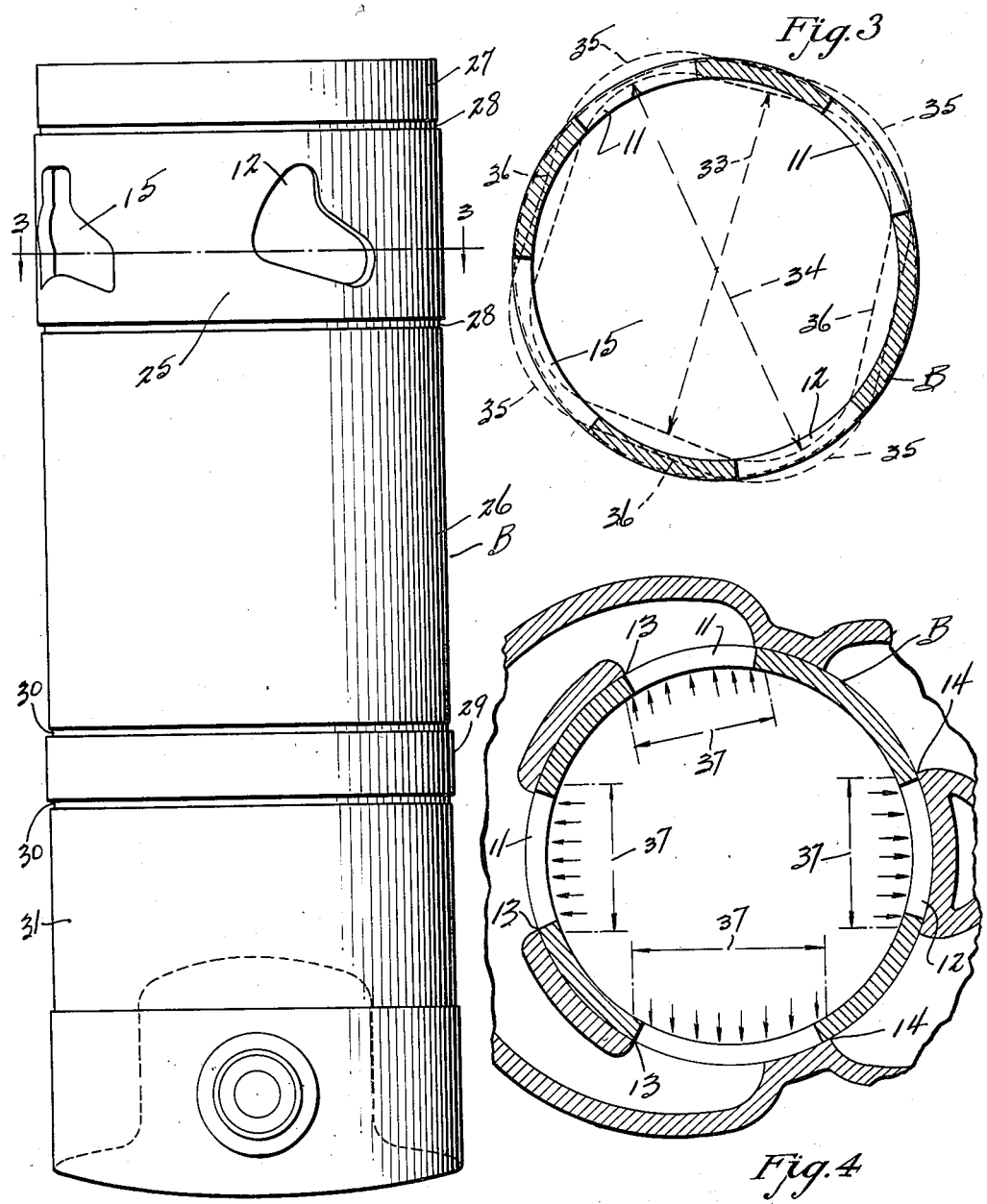
Fig. 2 is an elevation view of the sleeve valve.
Fig. 3 is a diagrammatic view of the sleeve valve sectioned through the ports thereof illustrating in exaggerated fashion the manner in which I distort the sleeve valve.
Fig. 4 illustrates the concentration of pressure at the ports resulting from the sleeve distortion.

Referring particularly to Fig. 2 it will be noted that the sleeve B has a zone, belt, or band 25 extending circumferentially around the sleeve preferably containing the sleeve intake and exhaust ports 13, 14, and 15, this band extending axially of the sleeve sufficiently beyond the ports to provide sufficient gas seal therefor, as for example ¼ of an inch in the illustration. The sleeve below and preferably above this band 25 is of reduced diameter such portions being respectively designated as 26 and 27. I preferably further undercut the sleeve to form an annular groove 28 between portion 25 of the sleeve and adjacent portions 26 and 27 such groove being adapted to collect and distribute lubricating oil between cylinder 10 and sleeve B. In Fig. 1$^a$ I have illustrated a modified form of this groove, the corresponding sleeve portions 25$^1$ being joined with portions 26$^1$, 27$^1$ by reason of the tapered face 28$^1$ which I have discovered offers somewhat smoother oil flow between the cylinder 10$^1$ and sleeve B$^1$ and is therefore somewhat more desirable in being more efficient for lubrication and for further reducing friction losses.

Returning to Fig. 2 I preferably further provide a second diametrically enlarged sleeve zone, belt, or band 29 spaced from band 25 preferably adjacent the bottom zone of the cylinder 10 as will be noted from Fig. 2 where the sleeve is in its lowermost position, this band 29 being grooved at 30 between sleeve portions 26 and 31 for similar purpose as grooves 28. In Fig. 1$^a$ the tapered face 30' is likewise illustrated instead of groove 28 intermediate sleeve portions 26' and 31'.

As an illustration of typical sleeve and cylinder fits which I have found adaptable for accomplishing the objects of my invention, I may fit zones 25 and 29 within cylinder 10 with .002 of an inch clearance and even less, the remaining portions of the sleeve preferably being free from contact with the cylinder. In this manner much of the friction losses of the engine may be eliminated to produce useful delivered horsepower output. It will be observed that in Fig. 1 with the crankshaft moving clockwise as indicated by the arrow the intake cycle is approximately just commencing and when the crankshaft completes 360° of rotation the intake gases will be compressed for firing, the piston 22 being in the same position as illustrated in Fig. 1 but the half-speed valve-shaft 20 will have moved through 180° of rotation to position the band or zone 25 upwardly in the sleeve pocket whereby the sleeve portion 26 will be positioned opposite the cylinder ports 11, 14. Thus, the peak pressures developed by the combustion in chamber 18 act outwardly within the sleeve at portions thereof having sufficient clearance with the cylinder to prevent friction losses between the sleeve and cylinder during explosion. Furthermore by reason of the bearing sleeve zones 25, 29 being a relatively small proportion of the total sleeve area the friction loss due to sleeve movement is greatly reduced and the sleeve bearing provided where it will act most efficiently. By reason of my invention I am enabled to provide unusually close fits between the cylinder and sleeve at the sleeve ports in order to realize an efficient gas seal with improved power output and without objectionable oil pumping and carbonization in the combustion chamber.

By way of further illustration I have formed the zones 25 and 29 with .0005 of an inch clearance with the cylinder, where the cylinder bore is about 3½ inches in diameter, with approximately .002 of an inch clearance for the zones 26, 27, and 31. The clearance for the latter zones should not exceed approximately .002 of an inch since substantially this amount is necessary to maintain a film of oil of ordinary quality between the cylinder and the walls of zones 26, 27 and 31. By maintaining an oil film I not only obtain the desired amount of lubrication but also provide for heat transfer from the combustion chamber to the sleeve valve and thence to the cylinder. It is desirable to provide as much clearance for zones 26, 27 and 31 as is feasible without breaking down the oil film at said zones, thereby realizing the fullest benefits of my invention resulting from the clearance zones and zones of relatively tight fit with the cylinder.

The foregoing improvements provide for important advances in the sleeve valve engine and similar arts and I desire it understood that my invention as thus far specifically described may be used apart from certain further improvements hereinafter described in detail. Thus I contemplate carrying my invention and improvements even further in accomplishing the objects of my invention.

Referring to Figs. 2 and 4 I have illustrated a sleeve valve adapted for localized yielding pressure at the sleeve ports in order to obtain improved gas seal at the ports. Thus the sleeve valve B, constructed as referred to hereinbefore, is distorted out of round into more or less generally rectangular shape, in the vicinity of the sleeve ports and, for convenience, in forming the distorted portion such distortion is preferably provided from substantially the groove 28 to the top of the sleeve valve.

In distorting the sleeve the diameters 33 intermediate the sleeve ports are reduced and the diameters 34 across the ports are increased to provide peaks or outwardly sprung portions 35 at the ports and valleys or inwardly sprung portions 36 intermediate the ports, it being understood that Fig. 3 is exaggerated for illustration. When the sleeve is fitted to the cylinder the peaks 35 and valleys 36 are sprung by the cylinder into substantially cylindrical form like the remainder of the sleeve but the outwardly springing tendency of the sleeve port regions provide pressure zones 37 outwardly against the cylinder as illustrated in Fig. 4, such zones preferably extending beyond the boundaries of the sleeve ports sufficient to provide the desired gas seal for the ports. The valleys 36 after assembly will have relatively low bearing pressure against the cylinder, my invention providing for concentrating the sleeve bearing pressure where it is most effective in accomplishing the objects of the invention. I have not illustrated the device for distorting the sleeve valves since this may be readily done in a number of suitable ways through the use of suitable expanding mandrels and the like.

By way of illustration in connection with the distorted sleeve I give below typical examples of dimensions controlling the sleeve and cylinder fits for a cylinder of 3⅛ inches bore, all figures being in inches:

| | | |
|---|---|---|
| Diameter of cylinder | 3.125 | 3.125 |
| Sleeve—Outside diameter before distortion and assembly | 3.122 | 3.124 |
| Sleeve—Diameter across ports after distortion prior to assembly | 3.127 | 3.127 |
| Sleeve—Diameter between ports after distortion prior to assembly | 3.117 | 3.121 |
| Sleeve—Diameter across ports after distortion and assembly | 3.125 | 3.125 |
| Sleeve—Diameter between ports after distortion and assembly | 3.119 | 3.123 |

In the above table the dimensions in the second column are for a tighter fit than with the dimensions in the first column and while such figures are purely illustrative they will serve to illustrate the general manner in which I distort the sleeve. With the sleeve valve thus deformed and fitted to the cylinder it will be noted that the resiliency of the sleeve at the ports will cause the sleeve to automatically maintain the desired gas tight seal as wear takes place, an important feature not possible with more conventional types of sleeves.

I desire it understood that all references herein to dimensions and the like in specific values is purely for illustrative purposes and to specifically illustrate embodiments of my invention, such values and other details and arrangements of parts being capable of wide variation within the scope and spirit of my invention as defined by the appended claims.

What I claim as my invention is:

1. An engine of the sleeve valve type comprising a cylinder and associated piston, a sleeve valve, said sleeve and cylinder having a pair of cooperating intake and exhaust ports, said sleeve having a diameter at its ports greater than its diameter adjacent thereto, and means for moving said sleeve whereby to successively position said diameter at said cylinder port.

2. An engine of the sleeve valve type comprising a cylinder and associated piston, a sleeve valve, said sleeve and cylinder having cooperating ports, said sleeve having a diameter at said ports greater than its diameter adjacent thereto, and means for moving said sleeve in a combined reciprocating and oscillating path, whereby to move the sleeve portion of lesser diameter into a position bounding the engine combustion chamber substantially at the time of maximum gas pressure therein.

3. An engine of the sleeve valve type comprising a cylinder and associated piston, a sleeve valve, means for imparting reciprocation to said sleeve, said sleeve and cylinder having cooperating intake and exhaust ports, said sleeve having an enlarged diameter adjacent the lower end thereof to provide a bearing surface for the sleeve, said enlarged diameter adapted to partially project below the cylinder when the sleeve is moved to its lowermost position.

4. An engine of the sleeve valve type comprising a cylinder and associated piston, a sleeve valve, said sleeve and cylinder having cooperating intake and exhaust ports, a piston operable within said sleeve, said sleeve being substantially free from contact with said cylinder as to those sleeve portions exposed to the peak pressures developed during engine combustion.

5. An engine of the sleeve valve type comprising a cylinder and associated piston, a sleeve valve, said sleeve and cylinder having cooperating intake and exhaust ports, a piston operable within said sleeve, said sleeve being substantially free from contact with said cylinder as to those sleeve portions exposed to the peak pressures developed during engine combustion, said sleeve having annular recesses bounding one edge of said enlarged portions.

6. In a sleeve valve engine having a cylinder provided with a port, a single tubular sleeve valve within the cylinder, a piston within said sleeve, said sleeve having an annular projection bearing in said cylinder, said sleeve provided with a port extending through said projection, and means imparting a combined reciprocation and oscillation to said sleeve, whereby to move said projection above said cylinder port.

7. An engine of the sleeve valve type comprising a cylinder and associated piston, a sleeve valve, said sleeve and cylinder having cooperating intake and exhaust ports, a piston operable within said sleeve, said sleeve being substantially free from contact with said cylinder as to those sleeve portions exposed to the peak pressures developed during engine combustion, said sleeve having tapered walls bounding said enlarged portions.

8. An engine of the sleeve valve type comprising a cylinder and associated piston, a sleeve valve, said sleeve and cylinder having cooperating intake and exhaust ports, a piston operable within said sleeve, said sleeve being substantially free from contact with said cylinder as to those sleeve portions exposed to the peak pressures developed during engine combustion, said sleeve having tapered walls bounding said enlarged portions, said sleeve having a reduced diameter at substantially all portions thereof whereby to engage said cylinder only at said annular projections.

9. An engine of the sleeve valve type comprising a cylinder and associated piston, a sleeve valve, said sleeve and cylinder having cooperating intake and exhaust ports, said sleeve being distorted in the vicinity of said sleeve port.

10. An engine of the sleeve valve type comprising a cylinder and associated piston, a sleeve valve, said sleeve and cylinder having cooperating intake and exhaust ports, said sleeve being sprung outwardly at said sleeve port.

11. An engine of the sleeve valve type comprising a cylinder and associated piston, a sleeve valve, said sleeve and cylinder having cooperating intake and exhaust ports, said sleeve being deformed at said sleeve ports to provide portions thereof of lesser and greater diameter than the normal diameter of the sleeve body portion.

12. An engine of the sleeve valve type comprising a cylinder and associated piston, a sleeve valve, said sleeve and cylinder having cooperating ports, said sleeve having a portion thereof distorted out of round.

13. An engine of the sleeve valve type comprising a cylinder and associated piston, a sleeve valve, said sleeve and cylinder having cooperating ports, said sleeve having a portion thereof distorted out of round, to provide for radial springing of the sleeve against the cylinder walls.

14. In a sleeve valve engine, a cylinder structure and associated piston, a sleeve valve structure, one of said structures having a portion carried thereby under radial tension for engagement with the other.

15. In a sleeve valve engine, a cylinder, a substantially cylindrical sleeve valve, a piston, said sleeve adapted for movement intermediate the piston and cylinder, one of the end portions of said sleeve being distorted out of round.

16. In a sleeve valve engine, a cylinder, a substantially cylindrical sleeve valve, a piston, said sleeve adapted for movement intermediate the piston and cylinder, said sleeve having ports spaced circumferentially thereof, said sleeve being distorted to provide circumferentially spaced radial peaks at the parts thereof.

17. A sleeve valve for internal combustion engines having a port, said sleeve being distorted in the vicinity of said port.

18. The method of obtaining a tight gas seal for the ports of cylindrical sleeve valves for use in internal combustion engines consisting in deforming the sleeves in the vicinity of the ports.

19. An engine of the sleeve valve type comprising a cylinder and associated piston, a sleeve valve, said sleeve and cylinder having cooperating intake and exhaust ports, and means providing a clearance between the sleeve valve and the cylinder at the portion of the latter adjacent the engine explosion chamber, said sleeve bearing in said cylinder.

20. In an engine of the sleeve valve type, a cylinder, a sleeve valve bearing in said cylinder, a piston within said sleeve in sliding engagement therewith, a cylinder head, said cylinder and sleeve having a pair of cooperating ports, said sleeve having a zone at said port in sliding engagement with said cylinder with a clearance zone substantially adjacent thereto, and means for moving said sleeve to position said clearance zone opposite said cylinder port substantially during maximum pressure developed by engine combustion.

21. In an engine of the sleeve valve type, a cylinder, a sleeve valve bearing in said cylinder, a piston within said sleeve in sliding engagement therewith, a cylinder head, said cylinder and sleeve having a pair of cooperating ports, said sleeve having a zone at said port in sliding engagement with said cylinder with a clearance zone substantially adjacent thereto, and means for moving said sleeve to position said clearance zone opposite said cylinder port substantially during maximum pressure developed by engine combustion, said sleeve port zone being masked by said cylinder head during said maximum pressure.

22. In an engine of the sleeve valve type, a cylinder, a sleeve valve bearing in said cylinder, a piston within said sleeve in sliding engagement therewith, a cylinder head, said cylinder and sleeve having a pair of cooperating ports, said sleeve having a zone at said port in sliding engagement with said cylinder with a clearance zone substantially adjacent thereto, said cylinder head and piston cooperating to provide a combustion chamber bounded by said sleeve, and means for moving said sleeve to position said clearance zone at said combustion chamber.

23. In an engine of the sleeve valve type, a cylinder, a sleeve valve bearing in said cylinder, a piston within said sleeve in sliding engagement therewith, a cylinder head, said cylinder and sleeve having a pair of cooperating ports, said sleeve having a zone at said port in sliding engagement with said cylinder with a clearance zone substantially adjacent thereto, said cylinder head and piston cooperating to provide a combustion chamber bounded by said sleeve, and means for moving said sleeve to position said clearance zone at said combustion chamber during substantially maximum pressure developed in said combustion chamber.

24. In an engine of the sleeve valve type, a cylinder, a sleeve valve bearing in said cylinder, a piston within said sleeve in sliding engagement therewith, a cylinder head, said cylinder and sleeve having a pair of cooperating ports, said sleeve having a zone at said port in sliding engagement with said cylinder with a clearance zone substantially adjacent thereto, said cylinder head and piston cooperating to provide a combustion chamber bounded by said sleeve, and means for alternately moving said sleeve to position said port and clearance zones to provide said combustion chamber boundary.

25. In an engine of the sleeve valve type, a cylinder, a sleeve valve bearing in said cylinder, a piston within said sleeve in sliding engagement therewith, a cylinder head, said cylinder and sleeve having a pair of cooperating ports, said sleeve having a zone at said port in sliding engagement with said cylinder with a clearance zone substantially adjacent thereto, said cylinder head and piston cooperating to provide a combustion chamber bounded by said sleeve, and means for alternately moving said sleeve to position said port and clearance zones opposite said cylinder port.

26. In an engine of the sleeve valve type, a cylinder, a sleeve valve bearing in said cylinder, a piston within said sleeve in sliding engagement therewith, a cylinder head, said cylinder and sleeve having a pair of cooperating ports, said sleeve having a zone at said port in sliding engagement with said cylinder with a clearance zone substantially adjacent thereto, and means for moving said sleeve to position said clearance zone opposite said cylinder port substantially during maximum pressure developed by engine combustion, said sleeve projecting below said cylinder for engagement with said sleeve moving means, said sleeve having a second zone of sliding engagement with said cylinder substantially adjacent the inner end of said cylinder.

27. In an engine of the sleeve valve type, a cylinder, a sleeve valve bearing in said cylinder, a piston within said sleeve in sliding engagement therewith, a cylinder head, said cylinder and sleeve having a pair of cooperating ports, said sleeve having a zone at said port in sliding engagement with said cylinder with a clearance zone substantially adjacent thereto, said cylinder head and piston cooperating to provide a combustion chamber bounded by said sleeve, and means for moving said sleeve to position said clearance zone at said combustion chamber, said sleeve projecting below said cylinder for engagement with said sleeve moving means, said sleeve having a second zone of sliding engagement with said cylinder substantially adjacent the inner end of said cylinder.

28. In an engine of the sleeve valve type, a cylinder, a sleeve valve bearing in said cylinder, a piston within said sleeve in sliding engagement therewith, a cylinder head, said cylinder and sleeve having a pair of cooperating ports, said sleeve having a zone at said port in sliding engagement with said cylinder with a clearance zone substantially adjacent thereto, said cylinder head and piston cooperating to provide a combustion chamber bounded by said sleeve, and means for alternately moving said sleeve to position said port and clearance zones to provide said combustion chamber boundary, said sleeve projecting below said cylinder for engagement with said sleeve moving means, said sleeve having a second zone of sliding engagement with said cylinder substantially adjacent the inner end of said cylinder.

29. In an engine of the sleeve valve type, a cylinder, a sleeve valve bearing in said cylinder, a piston within said sleeve in sliding engagement therewith, a cylinder head, said cylinder and sleeve having a pair of cooperating ports, said sleeve having a zone at said port in sliding engagement with said cylinder with a clearance zone substantially adjacent thereto, said cylinder head and piston cooperating to provide a combustion chamber bounded by said sleeve, and means for alternately moving said sleeve to position said port and clearance zone opposite said cylinder port, said sleeve projecting below said cylinder for engagement with said sleeve moving means, said sleeve having a second zone of sliding engagement with said cylinder substantially adjacent the inner end of said cylinder.

30. In an engine of the four stroke cycle sleeve valve type, a cylinder, a sleeve valve movable in said cylinder, a piston, a cylinder head, said piston at top position and said cylinder head together providing a clearance space for combustion, said sleeve having a cylinder clearance zone and a zone of cylinder engagement, and means for imparting an axial reciprocation to said sleeve whereby to position less of said cylinder engagement zone of the sleeve at said space at the end of the compression stroke of the piston than at the end of the exhaust stroke.

31. In an engine of the four stroke cycle sleeve valve type, a cylinder, a sleeve valve movable in said cylinder, a piston, a cylinder head, said piston at top position and said cylinder head together providing a clearance space for combustion, said sleeve having a cylinder clearance zone and a zone of cylinder engagement, and means for imparting an axial reciprocation to said sleeve whereby to position said cylinder engagement zone of said sleeve at said space at the end of the exhaust stroke of the piston and to position said clearance zone at said space at the end of the compression stroke.

32. A sleeve valve structure movably associated with the cylinder of an engine, said sleeve structure having a deformable portion engaging said cylinder whereby to maintain a seal.

ANDRE J. MEYER.